May 1, 1928.
H. A. McGOWAN
CRANK CASE IMPLEMENT
Filed Jan. 31, 1927
1,668,245
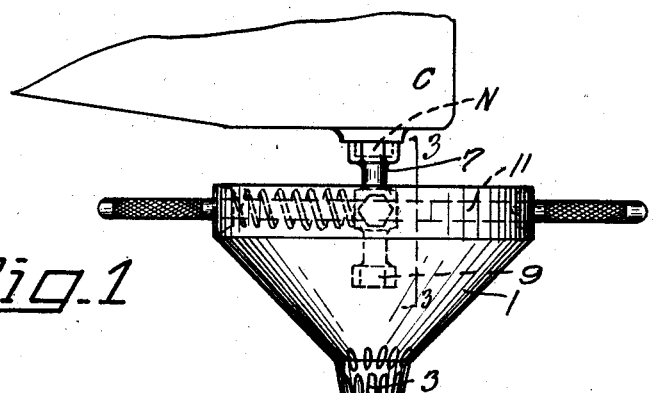
Fig. 1
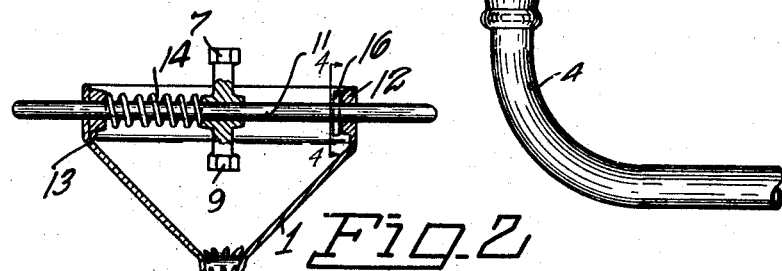
Fig. 2
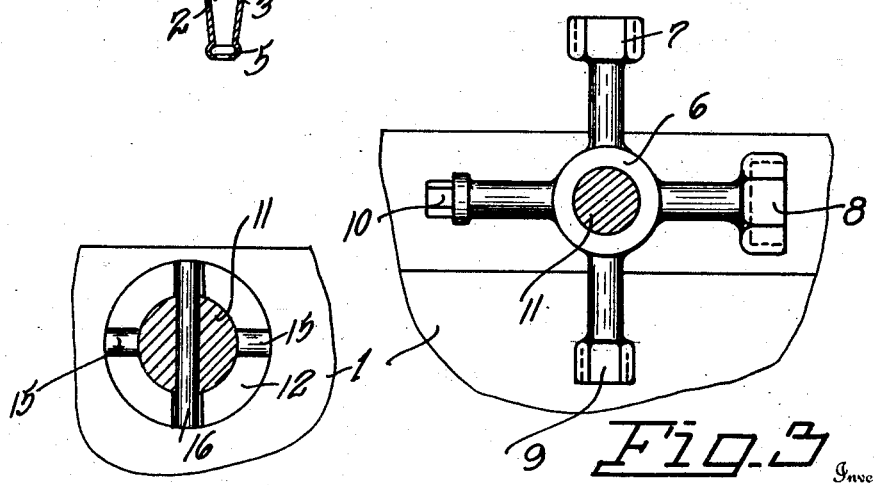
Fig. 4
Fig. 3
Inventor
Harold A. McGowan
By 
Attorney Patented May 1, 1928.

1,668,245

UNITED STATES PATENT OFFICE.

HAROLD A. McGOWAN, OF DAVENPORT, WASHINGTON.

CRANK-CASE IMPLEMENT.

Application filed January 31, 1927. Serial No. 165,020.

My present invention relates to an improved crank case implement which, while capable of numerous uses of various natures is especially designed and adapted for use in removing the plug or nut that normally closes the opening for draining oil from crank cases of automotive vehicles, and for receiving the oil drained therefrom when the plug or nut is removed. As is well known to those familiar with this work, great difficulty is encountered by the service man and others in the preparation of the crank case for draining its oil, because of the inconvenient location of the drain plug or nut.

The primary object of my invention is the provision of an implement or single tool that may be conveniently carried by a service man into a pit, or beneath an automotive vehicle at a service station or other place, when preparing to drain the crank case, and by means of which the closure plug or nut may be removed. As the plug or nut is removed, the oil draining through the opening is also caught by the implement, thus preventing waste or spilling, and permitting the oil to be disposed of as desired. The invention consists in an implement, combining the elements of a wrench and funnel as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1 is a view showing the utility of the implement as it is applied to a portion of the crank case of an automotive vehicle and with a drain hose attached.

Figure 2 is a vertical sectional view of the implement.

Figure 3 is a sectional view at line 3—3 of Figure 1 showing the wrench-heads.

Figure 4 is a detail sectional view showing, at line 4—4, the means for locking the wrench in adjusted position.

In order that the utility, general arrangement and relation of parts may readily be understood I have illustrated in Figure 1 a portion of the crank case C of an automotive vehicle and the closure nut N indicated in dotted lines, which latter is to be removed for draining the oil from the crank case.

In carrying out my invention I utilize a funnel as 1 having a spout 2 that is corrugated at 3 to form a hand hold or grip for the hand when the funnel or implement is being used to start the nut N for closing the opening, or for turning the nut after it has first been loosened preparatory to draining the case.

A flexible pipe or hose 4 is attached to the spout 2 in such manner that the latter may turn in the former as the implement is being used as a wrench, and of course the hose is used to convey the oil to a desired place as it is drained from the crank case. To permit relative rotary movement of the funnel spout in the hose end the spout is provided with an annular bead 5 and this bead also prevents leaking of the oil from the joint.

The wrench head is indicated as a whole by the numeral 6 and this head is provided with diametrically arranged or radially disposed heads 7, 8 and 9 used as sockets to fit over various sizes of nuts similar to nut N. One of the arms of the head also has a head 10 for use with a nut having a complementary socket in it, thus adapting the implement for use with various equipments on different crank cases.

Within the large upper end of the funnel is supported a cross bar 11, the free ends of which are utilized as handles by means of which the funnel and wrench head are turned when loosening the nut preparatory to removing it and when tightening the nut on the nipple of the crank case.

This bar is journaled in bearing bosses 12 and 13 on the inner face of the body of the funnel and the bar may be turned in the bearings or slid in them, the former for selecting a socket head of the wrench and the latter for locking the wrench head in selected, fixed position.

A spring 14 is coiled about a portion of the bar and interposed between the boss 13 and the wrench head 6, which of course is fixed on the bar, and the spring tends to push the bar to the right in Figure 2. For locking the bar against rotation I provide four radially disposed grooves or notches 15 in the face of the boss 12, and the cross pin 16 firmly fixed within a transverse opening in the bar, is forced into a pair of these grooves or notches by the spring for this purpose.

The funnel is thus adapted not only for use as a hand-piece for turning the nut, but simultaneously catches the oil spurting from the opening as the nut is removed from the crank case. The removed nut may be retained in its socket while the funnel receives the oil, then removed therefrom, or the nut may be directly replaced before a fresh supply of oil is furnished to the crank case.

Having thus fully described my invention, what I claim as new and desire to secure by Letters Patent is—

1. In a hand implement, the combination with a funnel, of a rotary handle bar supported therein, transversely of the funnel inlet opening, a wrench head on the bar having a plurality of selective wrench elements, and means for holding said bar in adjusted position.

2. The combination with a receptacle, of a rotary handle bar supported therein with its ends projecting from said receptacle, a wrench head fixed on the handle bar and a plurality of selective wrench elements on said head, and co-acting means on the receptacle and bar for locking the bar in adjusted position.

3. The combination with a funnel having bearing bosses one of which is provided with locking notches, of a slidable and rotatable wrench bar journaled in said bosses, a plural wrench-head fixed on the bar and a spring interposed between said head and one of said bosses, and a transverse locking pin on the bar for co-action with said notches.

In testimony whereof I affix my signature.

HAROLD A. McGOWAN.